(12) United States Patent
Izumikawa

(10) Patent No.: US 10,697,152 B2
(45) Date of Patent: Jun. 30, 2020

(54) EXCAVATOR

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 32 days.

(21) Appl. No.: 16/057,005

(22) Filed: Aug. 7, 2018

(65) Prior Publication Data

US 2018/0340316 A1 Nov. 29, 2018

Related U.S. Application Data

(63) Continuation of application No. PCT/JP2017/004521, filed on Feb. 8, 2017.

(30) Foreign Application Priority Data

Feb. 9, 2016 (JP) ................................. 2016-023097

(51) Int. Cl.
*E02F 3/43* (2006.01)
*E02F 9/26* (2006.01)
(Continued)

(52) U.S. Cl.
CPC .................. *E02F 9/26* (2013.01); *B60R 1/00* (2013.01); *E02F 3/32* (2013.01); *E02F 3/435* (2013.01);
(Continued)

(58) Field of Classification Search
CPC ....... E02F 9/26; E02F 3/32; E02F 9/16; E02F 9/261; E02F 9/264; B60R 1/00; B60R 2300/207
(Continued)

(56) References Cited

U.S. PATENT DOCUMENTS

| 9,454,147 B1* | 9/2016 | Friend .................... E02F 9/2045 |
| 2013/0169690 A1 | 7/2013 | Gotou et al. |

(Continued)

FOREIGN PATENT DOCUMENTS

| EP | 2876220 | 5/2015 |
| JP | H06-027288 U | 4/1994 |

(Continued)

OTHER PUBLICATIONS

International Search Report for PCT/JP2017/004521 dated Mar. 7, 2017.

*Primary Examiner* — Gertrude Arthur Jeanglaude

(74) *Attorney, Agent, or Firm* — IPUSA, PLLC

(57) ABSTRACT

An excavator according to an embodiment of the present disclosure includes a lower traveling body, an upper turning body pivotably mounted on the lower traveling body, an operator's compartment provided to the upper turning body, an attachment attached to the upper turning body, a first display device installed in the operator's compartment, a second display device installed in the operator's compartment, and a controller configured to calculate a distance between a height of a working part of the attachment and a predetermined target height. The first display device is configured to display operation information of the excavator and working part guidance information based on the distance. The second display device is configured to display at least one of a target terrain image and an image representing the excavator.

11 Claims, 10 Drawing Sheets

(51) Int. Cl.
   *B60R 1/00* (2006.01)
   *E02F 3/32* (2006.01)
   *E02F 9/16* (2006.01)
(52) U.S. Cl.
   CPC ............... *E02F 9/16* (2013.01); *E02F 9/261* (2013.01); *E02F 9/264* (2013.01); *B60R 2300/207* (2013.01)
(58) Field of Classification Search
   USPC ........................................................ 701/50
   See application file for complete search history.

(56) References Cited

U.S. PATENT DOCUMENTS

| | | |
|---|---|---|
| 2015/0218781 A1 | 8/2015 | Nomura et al. |
| 2015/0308082 A1 | 10/2015 | Takaura et al. |
| 2015/0345114 A1 | 12/2015 | Nomura et al. |
| 2016/0010312 A1 | 1/2016 | Kurihara et al. |
| 2016/0024757 A1 | 1/2016 | Nomura et al. |
| 2016/0186410 A1 | 6/2016 | Shioji et al. |
| 2016/0193920 A1 | 7/2016 | Tsubone et al. |
| 2016/0244949 A1 | 8/2016 | Kanemitsu |

FOREIGN PATENT DOCUMENTS

| | | | | |
|---|---|---|---|---|
| JP | H06-128987 | | 5/1994 | |
| JP | H10-183697 | | 7/1998 | |
| JP | 2001-123476 | | 5/2001 | |
| JP | 2005-248646 | | 9/2005 | |
| JP | 2009-150218 | | 7/2009 | |
| JP | 2012-062707 | | 3/2012 | |
| JP | 2013-023892 | | 2/2013 | |
| JP | 2014-074319 | | 4/2014 | |
| JP | 5476450 | | 4/2014 | |
| JP | 2014-098270 | | 5/2014 | |
| JP | 2014098270 A | * | 5/2014 | |
| JP | 2014-129676 | | 7/2014 | |
| JP | 2014-136943 | | 7/2014 | |
| JP | 2014-205955 | | 10/2014 | |
| JP | 2014205955 A | * | 10/2014 | |
| JP | 2015-209690 | | 11/2015 | |
| JP | 2015209690 A | * | 11/2015 | |
| JP | 5844465 | | 1/2016 | |
| JP | 5844465 B1 | * | 1/2016 | ............. E02F 9/264 |
| WO | 2014/103498 | | 7/2014 | |

* cited by examiner

EXCAVATOR

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/004521 filed on Feb. 8, 2017, designating the U.S., which claims priority based on Japanese Patent Application No. 2016-023097 filed on Feb. 9, 2016. The entire contents of each of the foregoing applications are incorporated herein by reference.

BACKGROUND

Technical Field

The present disclosure relates to an excavator provided with a machine guidance function.

Description of Related Art

In order to efficiently and precisely perform work such as excavation by an attachment, skilled operation techniques are required for an operator of an excavator as a construction machine. For this reason, there is an excavator having a function for guiding an operation of the excavator, so that even an operator with less excavator operation experience can perform work efficiently and precisely. The excavator is equipped with a display device in its cab for displaying a guidance image to provide guidance information to guide operation of the excavator to perform excavation or the like.

Further, another type of excavator is known, which is equipped with a display monitor of a small screen and a display monitor of a large screen. The display monitor of a large screen is used for displaying guidance information, and the display monitor of a small screen is used for displaying information other than the guidance information.

However, a display monitor of a large screen may obstruct a view of an operator when an operator is to see ahead or a vicinity of the excavator, and disturb an efficient and safe operation of the operator.

SUMMARY

An excavator according to an embodiment of the present disclosure includes a lower traveling body, an upper turning body pivotably mounted on the lower traveling body, an operator's compartment provided to the upper turning body, an attachment attached to the upper turning body, a first display device installed in the operator's compartment, a second display device installed in the operator's compartment, and a controller configured to calculate a distance between a height of a working part of the attachment and a predetermined target height. The first display device is configured to display operation information of the excavator and working part guidance information based on the distance. The second display device is configured to display a target terrain image, an image representing the excavator, or both the target terrain image and the image representing the excavator.

DETAILED DESCRIPTION

It is desirable to provide an excavator that can provide necessary guidance information for an operator during excavation in a manner more easy to see and not obstructing the front view of the operator.

The following description describes embodiments of an excavator which can provide necessary guidance information for an operator during excavation in a manner more easy to see and not obstructing the front view of the operator.

Figure 1:
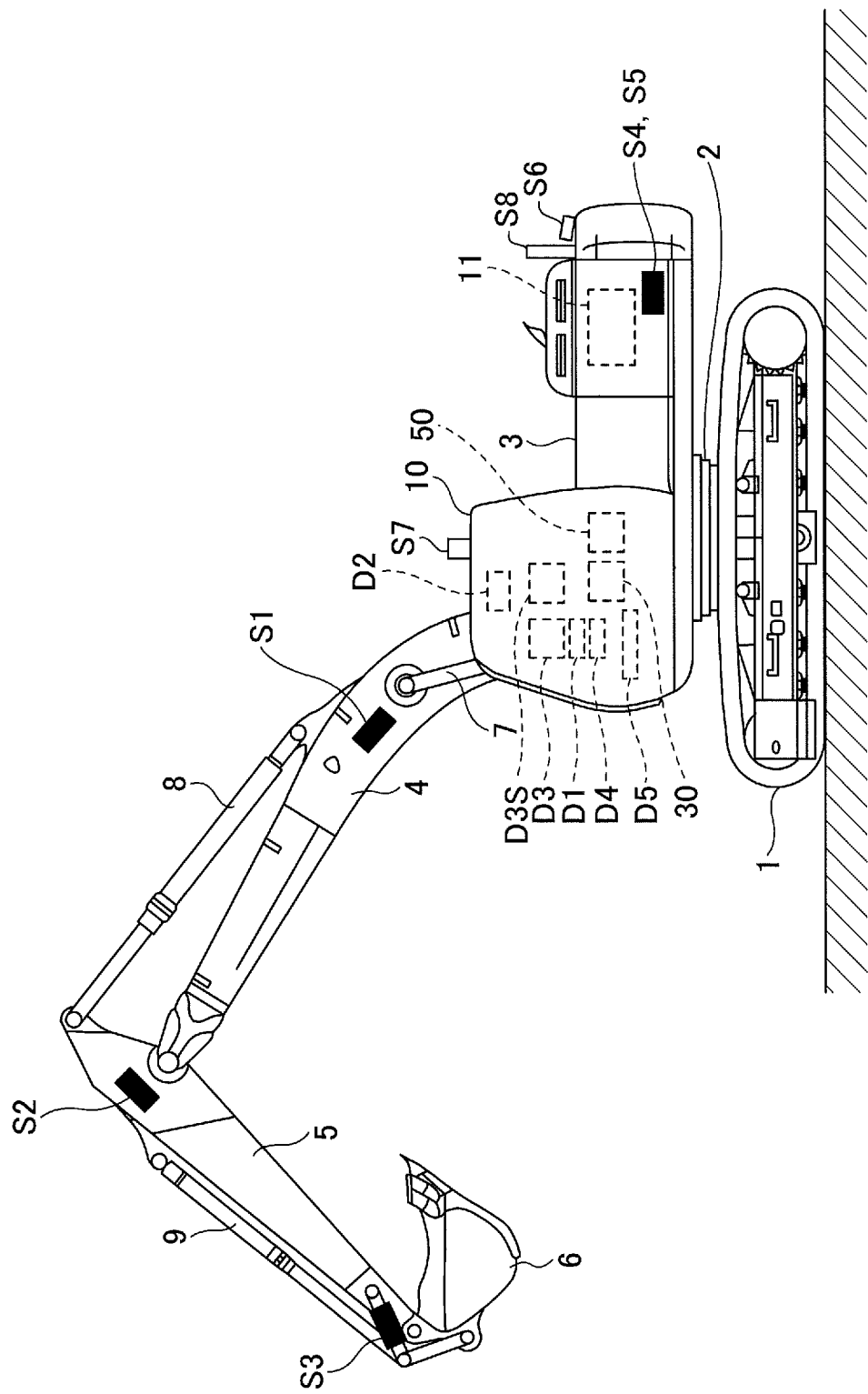
FIG. 1 is a side view of an excavator according to an embodiment.

FIG. 1 is a side view of an excavator (shovel) according to an embodiment of the present disclosure. An upper turning body 3 is pivotably mounted on a lower traveling body 1 of the excavator through a turning mechanism 2. A boom 4 is attached to the upper turning body 3. An arm 5 is attached to an end of the boom 4, and a bucket 6 is attached to an end of the arm 5 as an end attachment. As an end attachment, a bucket for a slope, a dredging bucket, etc., may be used.

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. A bucket tilt mechanism may be provided to the excavation attachment.

The boom angle sensor S1 detects a rotation angle of the boom 4. In the present embodiment, the boom angle sensor S1 is an acceleration sensor for detecting a rotation angle of the boom 4 with respect to the upper turning body 3 by detecting a tilt with respect to the horizontal plane.

The arm angle sensor S2 detects a rotation angle of the arm 5. In the present embodiment, the arm angle sensor S2 is an acceleration sensor for detecting a rotation angle of the arm 5 with respect to the boom 4 by detecting a tilt with respect to the horizontal plane.

The bucket angle sensor S3 detects a rotation angle of the bucket 6. In the present embodiment, the bucket angle sensor S3 is an acceleration sensor for detecting a rotation angle of the bucket 6 with respect to the arm 5 by detecting a tilt with respect to the horizontal plane. When the excavation attachment is equipped with the bucket tilt mechanism, the bucket angle sensor S3 additionally detects a rotational angle of the bucket 6 around a tilt axis.

Each of the boom angle sensor S1, the arm angle sensor S2, and the bucket angle sensor S3 may be a potentiometer using a variable resistor, a stroke sensor for detecting a stroke amount of a corresponding hydraulic cylinder out of the boom cylinder 7, the arm cylinder 8, and the bucket cylinder 9, a rotary encoder for detecting a rotation angle around a connecting pin, or the like. The boom angle sensor S1, the arm angle sensor S2, and the bucket angle sensor S3 constitute an attitude sensor for detecting an attitude of the excavation attachment.

A cab 10 which is an operator's compartment is provided at the upper turning body 3, and a power source such as an engine 11 is installed in the upper turning body 3. A body tilt sensor S4, a turning angular velocity sensor S5, and a camera S6 are attached to the upper turning body 3. A communication device S7 and a positioning device S8 may also be attached.

The body tilt sensor S4 detects a tilt of the upper turning body 3 with respect to the horizontal plane. In the present embodiment, the body tilt sensor S4 is a two-axis acceleration sensor for detecting a tilt angle around a front-rear axis and a tilt angle around a left-right axis of the upper turning body 3. The front-rear axis and the left-right axis of the upper turning body 3 are, for example, orthogonal to each other and pass through a center point of the excavator, which is a point on a turning axis.

The turning angular velocity sensor S5 is a gyrosensor, for example, and detects a turning angular velocity of the upper turning body 3. The turning angular velocity sensor S5 may be a resolver, a rotary encoder, or the like.

The camera S6 is a device for capturing an image in vicinity of the excavator. In the present embodiment, the camera S6 is one or more cameras attached to the upper turning body 3.

The communication device S7 is a device for controlling communication between the excavator and an outside. The communication device S7 controls, for example, radio communication between a GNSS (Global Navigation Satellite System) positioning system and the excavator. By using the communication device S7, the excavator can obtain design data including information such as a target construction surface, through radio communication. In this case, the communication device S7 acts as a target construction surface information acquisition unit. Alternatively, the excavator may obtain the design data using a semiconductor memory or the like. In this case, a reading device for the semiconductor memory or the like acts as a target construction surface information acquisition unit.

The positioning device S8 is an example of a position information acquisition unit for obtaining information about a position of the excavator. The positioning device S8 measures a position and an orientation of the excavator. In the present embodiment, the positioning device S8 is a GNSS receiver including an electronic compass, and the positioning device S8 measures latitude, longitude, and altitude of a point where the excavator is located, and an orientation of the excavator.

Inside the cab 10, an input device D1, an audio output device D2, a first display device D3, a second display device D3S, a storage device D4, a gate lock lever D5, a controller 30, and a machine guidance device 50 are installed.

The controller 30 functions as a main controller for executing drive control of the excavator. In the present embodiment, the controller 30 is configured by a processor including a CPU and an internal memory. Various functions of the controller 30 are embodied by the CPU executing a program stored in the internal memory.

The machine guidance device 50 is for guiding an operation of the excavator. In the present embodiment, the machine guidance device 50, for example, visually and aurally notifies an operator of a vertical distance between a target construction surface set by the operator and a position of a front edge (tip) of the bucket 6. By this notification, the machine guidance device 50 guides an operation of the excavator by the operator. The machine guidance device 50 may notify the operator of the distance only visually or only aurally. Specifically, the machine guidance device 50 may be configured by a processor including a CPU and an internal memory, similar to the controller 30. Various functions of the machine guidance device 50 are embodied by the CPU executing a program stored in the internal memory. The machine guidance device 50 may be incorporated in the controller 30.

The input device D1 is a device used by an operator of the excavator to input various types of information into the machine guidance device 50. In the present embodiment, the input device D1 is a membrane switch attached to a periphery of the first display device D3. To each of the first display device D3 and the second display device D3S, a corresponding input device D1 may be provided. In this case, a touch panel may be used as the input device D1.

The audio output device D2 outputs various types of audio information in response to an audio output command from the machine guidance device 50. In the present embodiment, an on-board speaker connected directly to the machine guidance device 50 is used as the audio output device D2. As the audio output device D2, an alarm device, such as a buzzer, may be used.

The first display device D3 and the second display device D3S output various types of image information in response to a command from the machine guidance device 50. In the present embodiment, an on-board liquid crystal display connected directly to the machine guidance device 50 is used as the first display device D3 and the second display device D3S. On the first display device D3, a camera image captured by the camera S6 is displayed. The camera image may be displayed on the second display device D3S. In the present embodiment, a screen size of the second display device D3S is larger than that of the first display device D3. However, the screen size of the second display device D3S is not required to be larger than that of the first display device D3.

The storage device D4 is a device for storing various types of information. In the present embodiment, a non-volatile storage medium, such as a semiconductor memory, is used as the storage device D4. The storage device D4 stores various types of information to be output by the machine guidance device 50 and the like.

The gate lock lever D5 is a mechanism for preventing the excavator from being erroneously operated. In the present embodiment, the gate lock lever D5 is disposed between a door of the cab 10 and an operator's seat. When the gate lock lever D5 is pulled up such that an operator cannot exit from the cab 10, various types of operation devices become operable. In contrast, when the gate lock lever D5 is pushed down such that the operator can exit from the cab 10, the various types of operation devices become inoperable.

Figure 2:
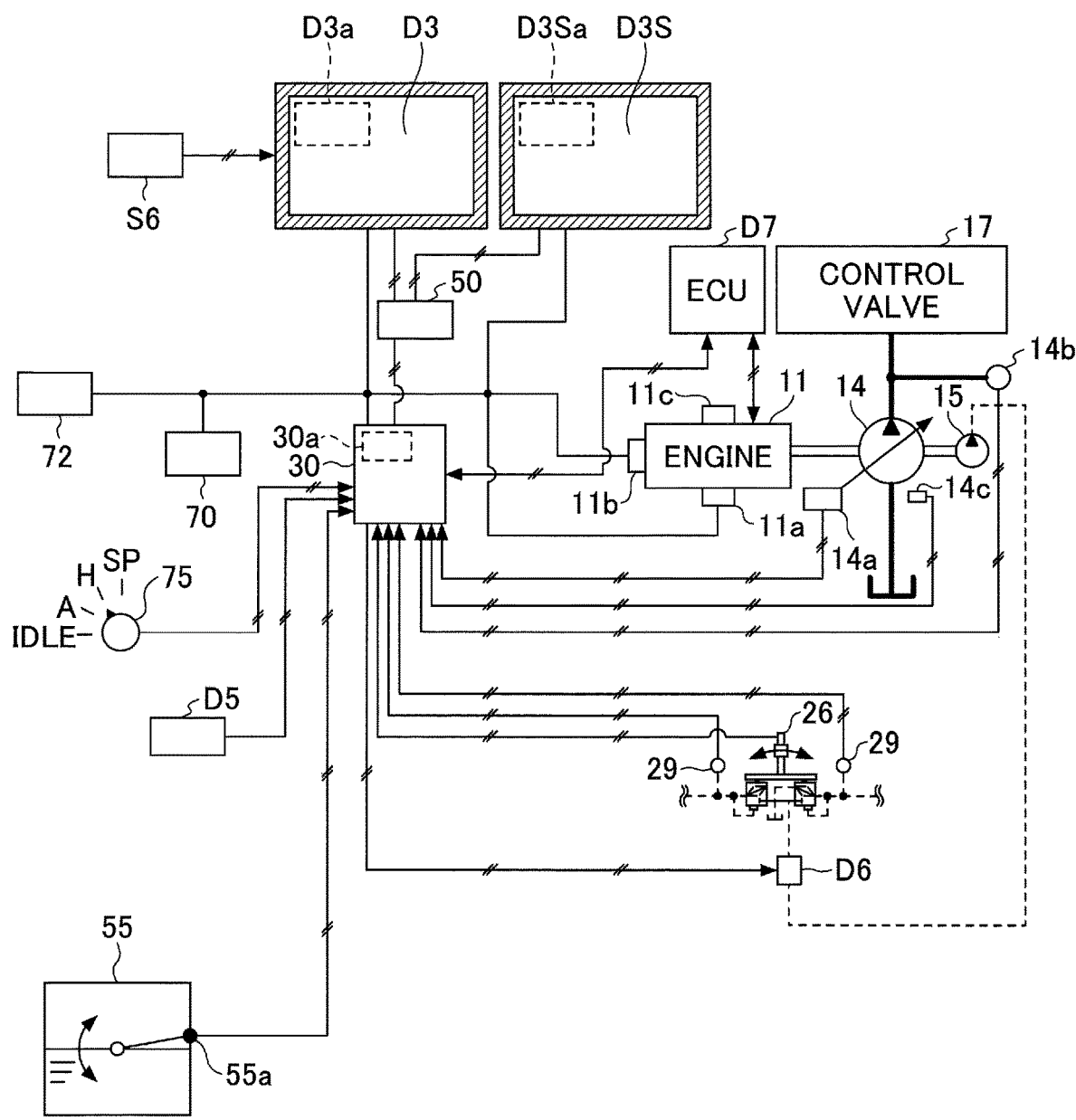
FIG. 2 is a diagram illustrating a configuration of a drive control system of the excavator illustrated in FIG. 1.

FIG. 2 is a diagram illustrating an example of a configuration of a drive control system of the excavator illustrated in FIG. 1. In FIG. 2, a mechanical drive system is indicated by a double line, a high pressure hydraulic line is indicated by a thick solid line, a pilot line is indicated by a dashed line, and an electronic drive/control system is indicated by a thin solid line.

The engine 11 is a power source of the excavator. In the present embodiment, the engine 11 is a diesel engine that adopts isochronous control such that a revolution speed of the engine is kept constant regardless of increase or decrease in an engine load. In the engine 11, an amount of fuel injected, a fuel injection timing, boost pressure, and the like, are controlled by an engine controller unit (ECU; may also be referred to as an "engine controller") D7.

A main pump 14 and a pilot pump 15 as hydraulic pumps are connected to a rotating shaft of the engine 11. A control valve 17 is connected to the main pump 14 through a high pressure hydraulic line.

The control valve 17 is a hydraulic control device for controlling a hydraulic system of the excavator. Hydraulic actuators, such as a right traveling hydraulic motor, a left traveling hydraulic motor, the boom cylinder 7, the arm cylinder 8, the bucket cylinder 9, and a turning hydraulic motor, are connected to the control valve 17 through the high pressure hydraulic line. The turning hydraulic motor may be a turning motor generator.

An operation device 26 is connected to the pilot pump 15 through a pilot line. The operation device 26 includes a lever and a pedal. The operation device 26 is connected to the control valve 17 through a hydraulic line and a gate lock valve D6.

The gate lock valve D6 is for switching communicating/blocking of the hydraulic line that connects the control valve 17 to the operation device 26. In the present embodiment, the gate lock valve D6 is an electromagnetic valve for switching communicating/blocking of the hydraulic line in response to a command from the controller 30. The controller 30 determines a state of the gate lock lever D5 based on a state signal output by the gate lock lever D5. If it is determined that the gate lock lever D5 is in a pulled-up state, the controller 30 outputs a communication command to the gate lock valve D6. In response to receiving the communication command, the gate lock valve D6 opens to communicate the hydraulic line. As a result, an operation of the operation device 26 by an operator becomes effective. Conversely, if it is determined that the gate lock lever D5 is in a pulled-down state, the controller 30 outputs a blocking command to the gate lock valve D6. In response to receiving the blocking command, the gate lock valve D6 closes to block the hydraulic line. As a result, an operation of the operation device 26 by the operator becomes ineffective.

A pressure sensor 29 detects details of an operation of the operation device 26 by an operator in a form of pressure. The pressure sensor 29 outputs a detected value to the controller 30.

FIG. 2 illustrates the relationships of the connections between the controller 30 and the first and second display devices D3 and D3S. In the present embodiment, the first display device D3 and the second display device D3S are connected to the controller 30 via the machine guidance device 50. The first display device D3, the second display device D3S, the machine guidance device 50, and the controller 30 may be connected through a communication network, such as a CAN.

The first display device D3 includes a conversion processor D3a for generating an image. In the present embodiment, the conversion processor D3a generates a camera image to be displayed based on an output of the camera S6. The camera S6 may be connected to the first display device D3, for example, through a dedicated line.

The conversion processor D3a generates an image to be displayed based on an output of the controller 30 or the machine guidance device 50. In the present embodiment, the conversion processor D3a converts various types of information output by the controller 30 or the machine guidance device 50 into image signals. Examples of the information output by the controller 30 include data indicating a temperature of engine coolant, data indicating a temperature of hydraulic oil, data indicating a residual amount of fuel, data indicating a residual amount of urea water. Examples of the information output by the machine guidance device 50 include data indicating a position of a front edge (tip) of the bucket 6, data indicating an orientation of a slope that is a work target, data indicating an orientation of the excavator, and data indicating an operation direction for causing the excavator to directly face a slope.

Similar to the first display device D3, the second display device D3S includes a conversion processor D3Sa for generating an image. In the present embodiment, because the second display device D3S is not connected to the camera S6 directly, the conversion processor D3Sa does not generate a camera image. However, the conversion processor D3Sa may generate a camera image in a case in which the second display device D3S is connected to the camera S6 directly.

The conversion processor D3Sa generates an image to be displayed based on an output of the machine guidance device 50. In the present embodiment, the conversion processor D3Sa converts various types of information output by the machine guidance device 50 into image signals. However, the conversion processor D3Sa may generate an image to be displayed based on an output of the controller 30.

The conversion processor D3a may be implemented as a function of the controller 30 or the machine guidance device 50, instead of the function of the first display device D3. This can also be applied to the conversion processor D3Sa. In the case in which the conversion processor D3a is implemented as a function of the controller 30 or the machine guidance device 50, the camera S6 is connected to the controller 30 or the machine guidance device 50, instead of the first display device D3.

The first display device D3 and the second display device D3S operate using electrical power supplied from a storage battery 70. The storage battery 70 is charged with electric power generated by an alternator 11a (generator) of the engine 11. The electric power of the storage battery 70 is also supplied to an electrical equipment 72 and the like of the excavator, in addition to the controller 30, the first display device D3, and the second display device D3S. A starter 11b of the engine 11 is driven by the electric power from the storage battery 70 to start the engine 11.

The engine 11 is controlled by the engine controller unit D7. From the engine controller unit D7, various data indicating a state of the engine 11 is constantly transmitted to the controller 30. The various data indicating a state of the engine 11 is an example of operation information of the excavator. An example of the operation information includes data indicating a coolant temperature detected by a water temperature sensor 11c acting as an operation information acquisition unit. The controller 30 stores the data in a temporary storage unit (memory) 30a, and can transmit the data to the first display device D3 when necessary.

As described below, various data, as operation information of the excavator, is supplied to the controller 30. The various data is stored in the temporary storage unit 30a of the controller 30.

For example, data indicating a swash plate inclination angle is supplied from a regulator 14a of the main pump 14, which is a variable displacement hydraulic pump, to the controller 30. Data indicating discharge pressure of the main pump 14 is also transmitted from a discharge pressure sensor 14b to the controller 30. These data elements are stored in the temporary storage unit 30a. Further, as an oil temperature sensor 14c is provided in a pipeline between a tank, in which hydraulic oil to be suctioned by the main pump 14 is stored, and the main pump 14, data representing a temperature of the hydraulic oil flowing through the pipeline is supplied from the oil temperature sensor 14c to the controller 30. Each of the regulator 14a, the discharge pressure sensor 14b, and the oil temperature sensor 14c is an example of the operation information acquisition unit.

Data indicating a fuel storage amount is supplied from a fuel storage amount detector 55a in a fuel container 55 to the controller 30. In the present embodiment, data indicating a residual amount of fuel is supplied from a fuel residual quantity sensor, as the fuel storage amount detector 55a in the fuel container 55, which is a fuel tank, to the controller 30.

Specifically, the fuel residual quantity sensor is formed of a float that follows a liquid surface, and a variable resister (potentiometer) that converts a vertical fluctuation amount of the float into a resistance value. With this configuration, the fuel residual quantity sensor can cause the first display device D3 to continuously display the residual quantity state of the fuel. The detection method of the fuel storage amount detector 55a may be suitably selected depending on an operating environment and the like, and a detection method may be adopted with which the residual quantity state of the fuel can be displayed in a stepwise manner. The above mentioned configuration can also be applied to a urea water tank.

When the operation device 26 is operated, pilot pressure transmitted to the control valve 17 is detected by the pressure sensor 29. Data indicating the pilot pressure detected by the pressure sensor 29 is supplied to the controller 30.

In the excavator according to the present embodiment, an engine speed adjustment dial 75 is provided in the cab 10. The engine speed adjustment dial 75 is a dial for adjusting a revolution speed of the engine 11, and in the present embodiment, the revolution speed can be switched in four steps. From the engine speed adjustment dial 75, data indicating a setup state of the revolution speed of the engine is transmitted to the controller 30. The engine speed adjustment dial 75 can switch the revolution speed of the engine in four steps, which are an SP mode, an H mode, an A mode, and an idling mode. FIG. 2 depicts a state in which the H mode is selected in the engine speed adjustment dial 75.

The SP mode is a mode (rev mode) to be selected when an amount of work is to be prioritized, and while in the SP mode, the revolution speed of the engine is set to be the highest. The H mode is a mode to be selected when both an amount of the work and fuel efficiency are to be prioritized, and in the H mode, the revolution speed of the engine is set to be the second highest. The A mode is a mode to be selected when the excavator is to be operated at a low noise while prioritizing the fuel efficiency, and in the A mode, the revolution speed of the engine is set to be the third highest. The idling mode is a mode to be selected when the engine 11 is to be in an idling state, and in the idling mode, the revolution speed of the engine is set to be the lowest. The revolution speed of the engine 11 is controlled to be constant at the revolution speed corresponding to the selected mode using the engine speed adjustment dial 75.

Figure 3:
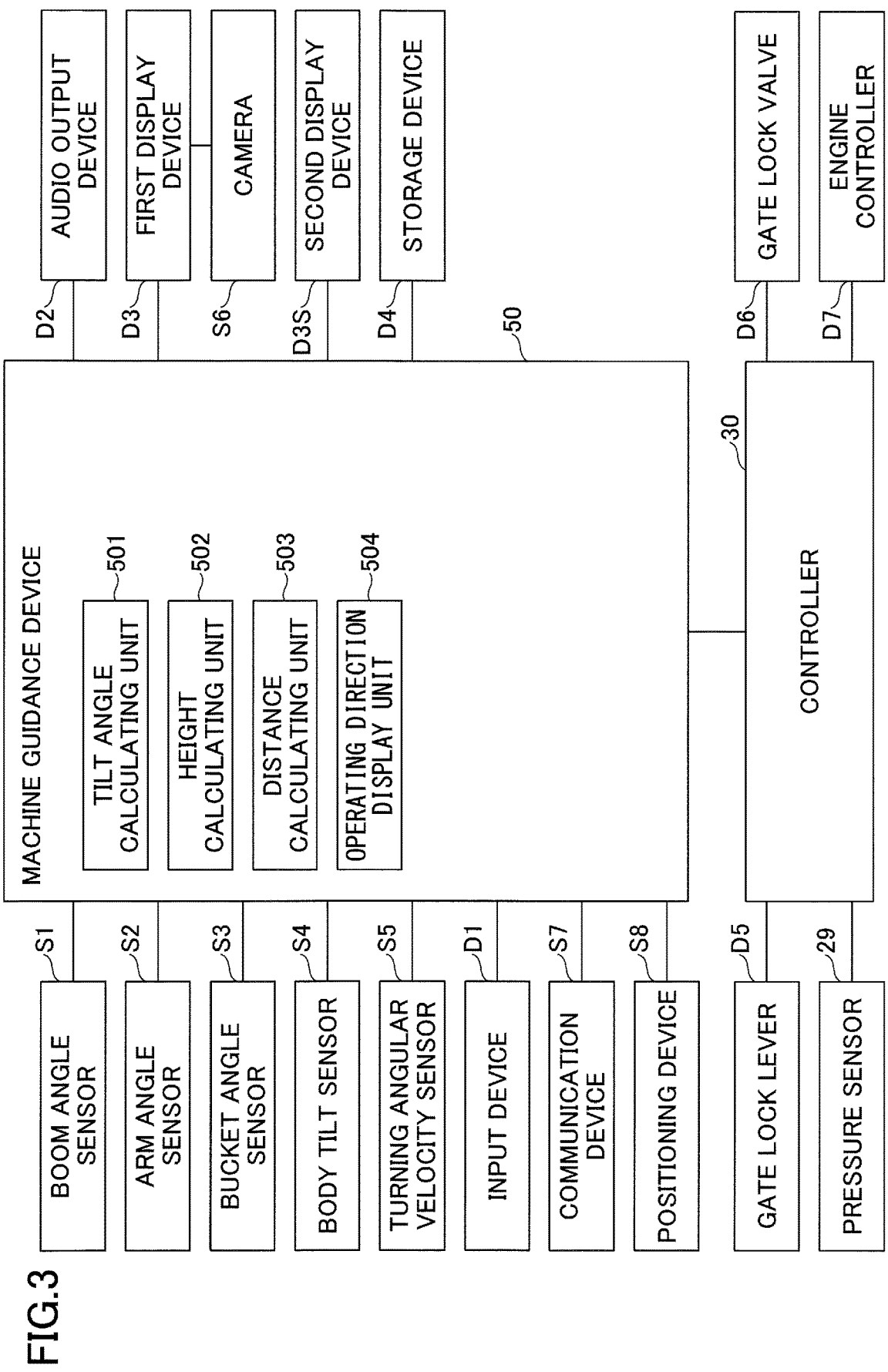
FIG. 3 is a block diagram illustrating an example of a configuration of a machine guidance device.

Next, each functional element of the machine guidance device 50 will be described with reference to FIG. 3. FIG. 3 is a functional block diagram illustrating an example of a configuration of the machine guidance device 50.

The machine guidance device 50 receives information output from the boom angle sensor S1, the arm angle sensor S2, the bucket angle sensor S3, the body tilt sensor S4, the turning angular velocity sensor S5, the input device D1, the communication device S7, the positioning device S8, the controller 30, and the like. Then, the machine guidance device 50 performs various calculations based on the received information and information stored in the storage device D4, and outputs results of the calculations to the audio output device D2, the first display device D3, the second display device D3S, and the like.

For example, the machine guidance device 50 calculates a height of a working part of the attachment, and outputs, to at least one of the audio output device D2 and the first display device D3, a control command corresponding to a magnitude of distance between the height of the working part and a given target height. The audio output device D2 having received the control command outputs sound representing the magnitude of distance. The first display device D3 having received the control command outputs an image representing the magnitude of distance. The target height mentioned here is a concept that includes a target depth. For example, in 3-dimensional machine guidance (machine guidance using GNSS data), the target height can be calculated automatically based on the design data stored in the storage device D4 and a current position and orientation of the excavator. In 2-dimensional machine guidance (machine guidance not using GNSS data), the target height is a vertical distance from a reference point having a known latitude, longitude, and altitude, and the target height is a value entered by an operator after the working part is made to contact with the reference point. In the following, information about the magnitude of distance between the height of the working part of the attachment and the target height that is displayed on the first display device D3 is referred to as "working part guidance information". The operator can perform an operation while checking shift of the magnitude of distance, by looking at the working part guidance information.

To perform the above mentioned guidance, the machine guidance device 50 includes functional units such as a tilt angle calculating unit 501, a height calculating unit 502, a distance calculating unit 503, and an operating direction display unit 504.

The tilt angle calculating unit 501 calculates a tilt angle of the upper turning body 3 (tilt angle of the excavator) with respect to the horizontal plane based on a detection signal from the body tilt sensor S4. That is, the tilt angle calculating unit 501 calculates a tilt angle of the excavator using the detection signal from the body tilt sensor S4.

The height calculating unit 502 calculates the height of the working part of the attachment from a reference surface, based on the tilt angle calculated by the tilt angle calculating unit 501, an angle of the boom 4 calculated by a detection signal from the boom angle sensor S1, an angle of the arm 5 calculated by a detection signal from the arm angle sensor S2, and an angle of the bucket 6 calculated by a detection signal from the bucket angle sensor S3. In the present embodiment, excavation is performed with the front edge of the bucket 6. Accordingly, the front edge (tip) of the bucket 6 corresponds to the working part of the attachment. However, when a work such as smoothing gravel with a back face of the bucket 6 is performed, the back face of the bucket 6 corresponds to the working part of the attachment. When a breaker is used as the end attachment other than the bucket 6, the front edge of the breaker corresponds to the working part of the attachment. An example of the reference surface is a horizontal surface on which the excavator is located.

The distance calculating unit 503 calculates a difference (distance) between a height of the working part calculated by the height calculating unit 502 and a target height. In the present embodiment, the distance calculating unit 503 calculates a distance between a height of the front edge (tip) of the bucket 6 calculated by the height calculating unit 502 and a target height.

The operating direction display unit 504 is a functional unit for displaying an image indicating an operation direction for causing the excavator to directly face a slope of a work target, on an output image. In the present embodiment, the operating direction display unit 504 automatically calculates a direction facing a slope directly, from the design data, and displays an arrow indicating a direction for causing the excavator to directly face the slope, by superimposing the arrow on a terrain image. The terrain image includes, for example, a target terrain image, which is a 3-dimensional CG image of a target construction surface. The operating direction display unit 504 may display an image indicating an operation direction for causing the excavator to directly face a slope on a location other than a location where a terrain image is displayed. An image indicating an operation direction may be an image indicating a turning direction or an image indicating a travel direction.

Figure 4:
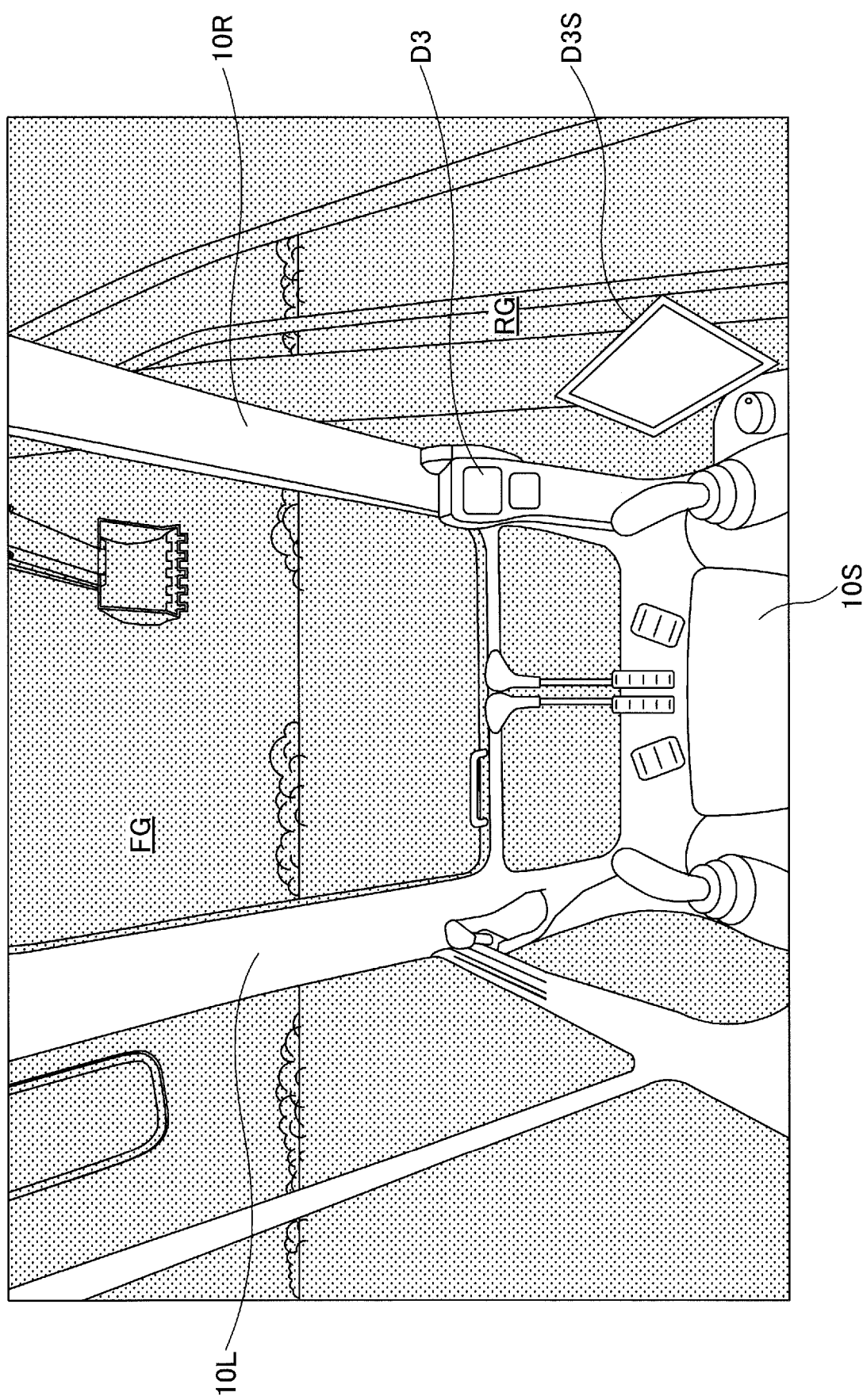
FIG. 4 is an oblique view of an inside of a cab.

Next, an example of a location to which each of the first display device D3 and the second display device D3S is fitted will be described with reference to FIG. 4. FIG. 4 is an oblique view of an inside of the cab 10, which is viewed by a person looking ahead of the excavator from the operator's seat 10S. In the example illustrated in FIG. 4, the first display device D3 is fitted to a right pillar 10R located in front of a right side relative to the operator's seat 10S such that the first display device D3 settled within a width of the right pillar 10R. This is because the first display device D3 can be seen from an operator sitting on the operator's seat facing forward, while the operator is operating. Specifically, when the operator sees the bucket 6 through a front glass FG such that the bucket 6 is within a central visual field, the first display device D3 can be captured within a peripheral visual field. The second display device D3S is placed in front of a right side glass RG. This is because the second display device D3S does not prevent the operator from seeing the bucket 6 through the front glass FG. Therefore, an area of the front glass FG of the cab 10, which is covered by the second display device D3S, is smaller than an area of the front glass FG covered by the first display device D3. The second display device D3S may be fitted to a left pillar 10L, as long as the second display device D3S does not prevent the operator from seeing the bucket 6 through the front glass FG. In the example illustrated in FIG. 4, the second display device D3S is placed closer to the operator's seat 10S than the first display device D3. This is to make an operation of an input device attached to the second display device D3S easier. Examples of the operation of the input device include an operation of magnifying or shrinking a screen, an operation of scrolling a screen, an operation of switching a screen, and an operation of setting threshold values. The threshold values include a condition of issuing a warning or the like.

Figure 5:
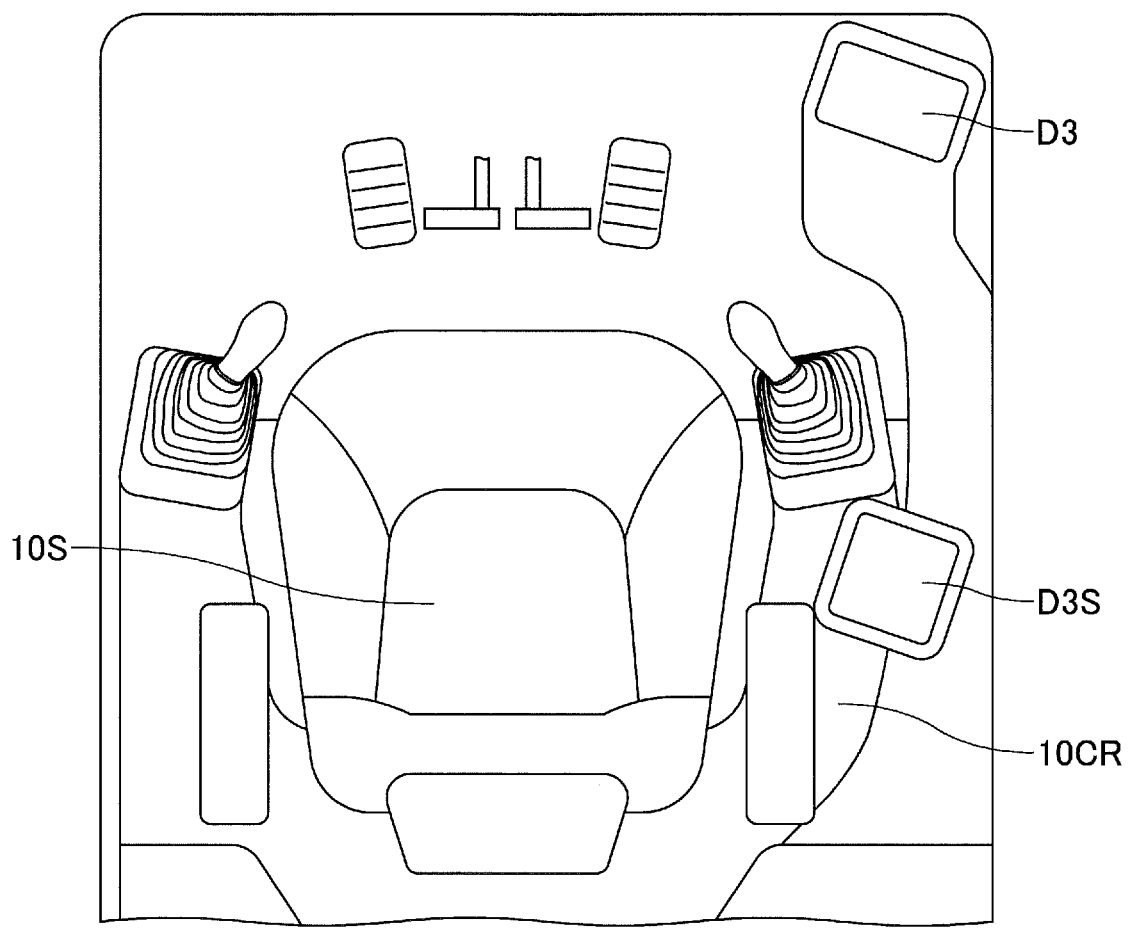
FIG. 5 is a top view of the inside of the cab.

Next, another example of a location at which each of the first display device D3 and the second display device D3S is fitted will be described with reference to FIG. 5. FIG. 5 is a top view of an inside of the cab 10, which is viewed when the operator's seat 10S is seen from above. In the example illustrated in FIG. 5, the first display device D3 is fitted to the right pillar 10R, similar to the example in FIG. 4. The second display device D3S is attached on the right console 10CR such that a screen is substantially in a horizontal state. An operator can look down at the screen of the second display device D3S by turning to the right while the operator is sitting on the operator's seat 10S. Also, in the example illustrated in FIG. 5, the second display device D3S is placed closer to the operator's seat 10S than the first display device D3.

Figure 6A:
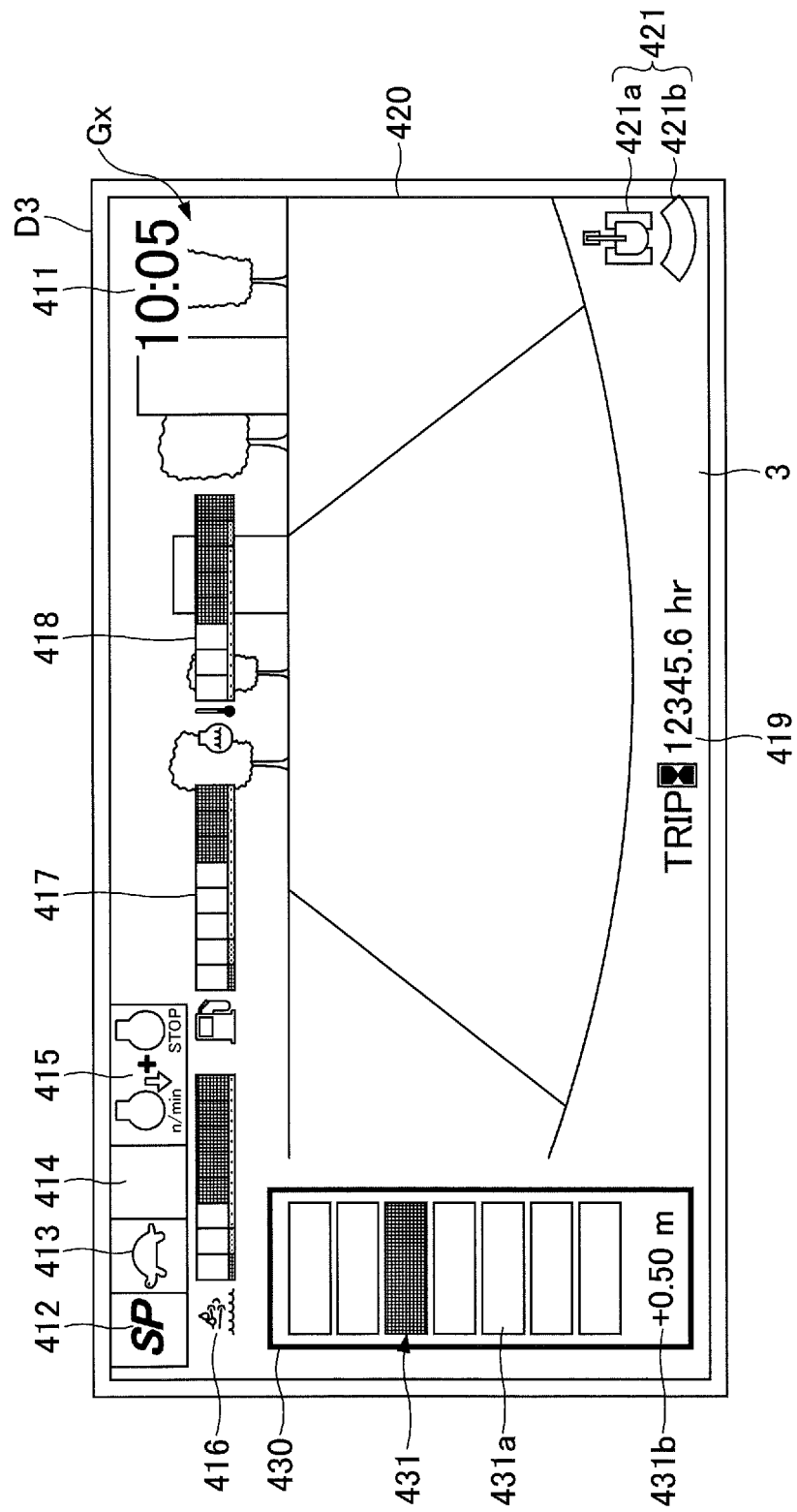
FIG. 6A is a diagram illustrating an example of an output image displayed on a first display device.
Figure 6B:
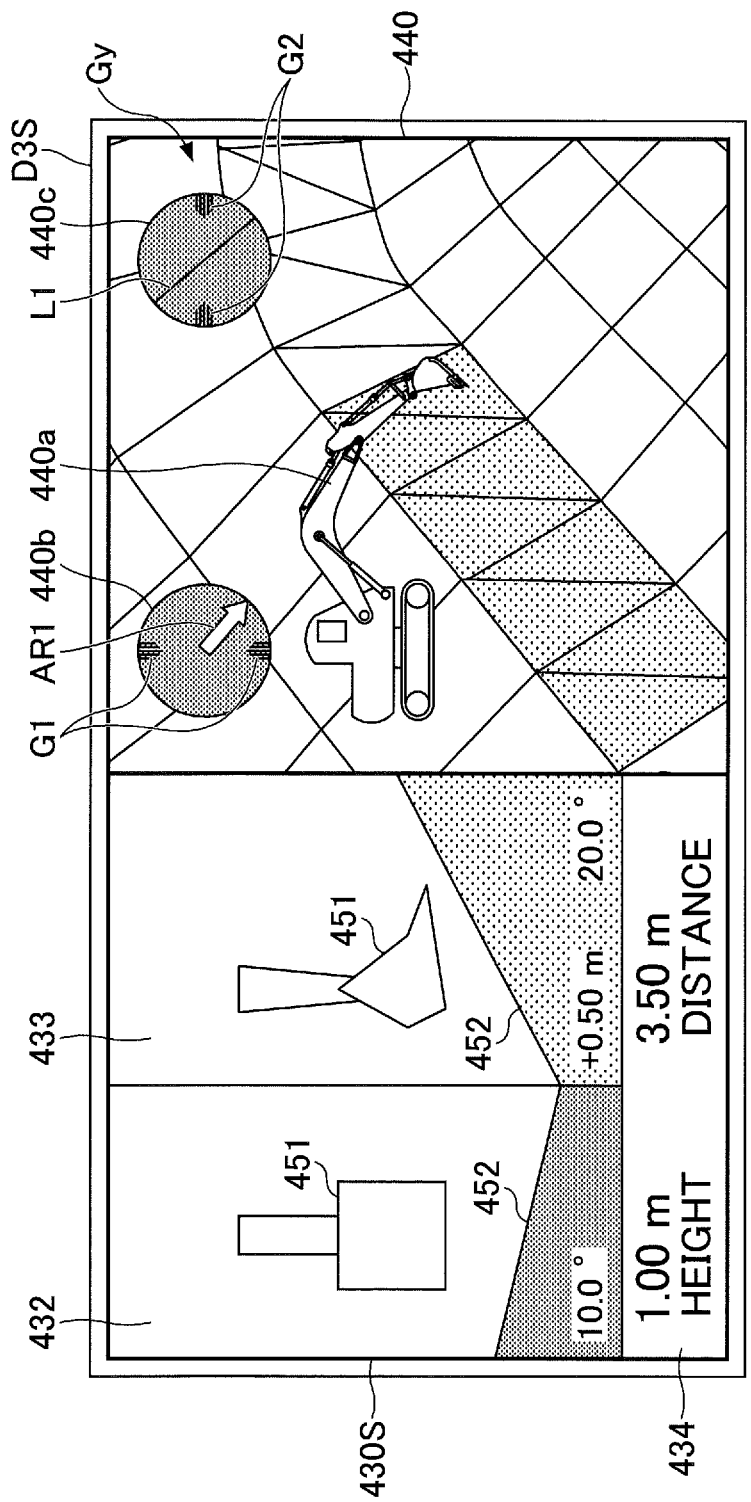
FIG. 6B is a diagram illustrating an example of an output image displayed on a second display device.

Next, an example of output images displayed when the machine guidance device 50 is used will be described with reference to FIG. 6A and FIG. 6B. FIG. 6A illustrates an example of an output image Gx displayed on the first display device D3, and FIG. 6B illustrates an example of an output image Gy displayed on the second display device D3S.

As illustrated in FIG. 6A, the output image Gx includes a time display section 411, a rev mode display section 412, a drive mode display section 413, an attachment display section 414, an engine control state display section 415, a urea water residual amount display section 416, a fuel residual amount display section 417, a coolant temperature display section 418, an engine operation time display section 419, a camera image display section 420, and a first operation guidance display section 430. The rev mode display section 412, the drive mode display section 413, the attachment display section 414, and the engine control state display section 415 are specific examples of an excavator setting state display part. The urea water residual amount display section 416, the fuel residual amount display section 417, the coolant temperature display section 418, and the engine operation time display section 419 are specific examples of an excavator operation state display part. An image displayed on each of the sections is generated by the conversion processor D3a of the first display device D3, based on various data transmitted from the controller 30 or the machine guidance device 50, and based on the camera image transmitted from the camera S6.

The time display section 411 displays a current time. In the example illustrated in FIG. 6A, a mode for digitally displaying time is employed, and a current time (five minutes past ten o'clock) is digitally displayed.

The rev mode display section 412 displays, as the operation information of the excavator, a rev mode selected by the engine speed adjustment dial 75. Examples of the rev mode include, as described earlier, the SP mode, the H mode, the A mode, and the idling mode. In the example illustrated in FIG. 6A, a symbol "SP" representing the SP mode is displayed.

The drive mode display section 413 displays a drive mode as the operation information of the excavator. The drive mode represents a configuration status of a traveling hydraulic motor using a variable displacement motor. Examples of the drive mode include a low-speed mode and a high-speed mode. During the low-speed mode, a mark having a shape of a "turtle" is displayed. Conversely, during the high-speed mode, a mark having a shape of a "rabbit" is displayed. As the mark of a "turtle" is displayed in the example illustrated in FIG. 6A, an operator can recognize that the excavator is in the low-speed mode.

The attachment display section 414 displays, as the operation information of the excavator, an image representing an attachment currently fitted drive mode. Various types of end attachment such as the bucket 6, a rock drill, a grapple, and a lifting magnet can be fitted to the excavator. The attachment display section 414 displays, for example, a mark having a shape of the end attachment, or a number corresponding to the attachment. In the example illustrated in FIG. 6A, the bucket 6 is fitted as an end attachment, and the attachment display section 414 is blank, as illustrated in FIG. 6A. In a case in which a rock drill is fitted as an end attachment, a mark having a shape of a rock drill is displayed on the attachment display section 414 with a number representing power of the rock drill.

The engine control state display section 415 displays a control state of the engine 11, as the operation information of the excavator. In the example illustrated in FIG. 6A, an "automatic slowdown/stop mode" is selected as the control state of the engine 11. The "automatic slowdown/stop mode" represents a control state in which a speed of the engine 11 is automatically reduced or the engine 11 is automatically stopped in accordance with a length of time when the excavator is not operated continuously. As other control states of the engine 11, an "automatic slowdown mode", an "automatic stop mode", a "manual slowdown mode", and the like are included.

The urea water residual amount display section 416 displays a remaining amount of urea water stored in the urea water tank, as the operation information of the excavator. In the example illustrated in FIG. 6A, a bar gauge representing a current remaining amount of urea water is displayed. The remaining amount of urea water is displayed based on data output from a urea water residual amount sensor.

The fuel residual amount display section 417 displays a remaining amount of fuel stored in the fuel tank, as the operation information of the excavator. In the example illustrated in FIG. 6A, a bar gauge representing a current remaining amount of fuel is displayed. The remaining amount of fuel is displayed based on data output from a fuel residual amount sensor.

The coolant temperature display section 418 displays a temperature of engine coolant as the operation information of the excavator. In the example illustrated in FIG. 6A, a bar gauge representing a temperature of the engine coolant is displayed. The temperature of the engine coolant is displayed based on data output from the water temperature sensor 11*c*.

The engine operation time display section 419 displays a cumulative operating time of the engine 11 as the operation information of the excavator. In the example illustrated in FIG. 6A, an accumulation of operating time after counting was restarted by an operator is displayed with a unit of time (hr (hour)). On the engine operation time display section 419, an amount of operating time after the excavator was manufactured, or an accumulation of operating time after counting was restarted by an operator is displayed.

The camera image display section 420 displays an image captured by the camera S6. In the example illustrated in FIG. 6A, an image captured by a rear camera disposed at a rear end of an upper surface of the upper turning body 3 is displayed on the camera image display section 420. However, an image captured by a left side camera disposed at a left end of an upper surface of the upper turning body 3 or an image captured by a right side camera disposed at a right end of an upper surface of the upper turning body 3 may be displayed on the camera image display section 420. Alternatively, images captured by more than one of the rear camera, the left side camera, and the right side camera may be displayed in parallel on the camera image display section 420. Further, a synthetic image made from images captured by more than one of the rear camera, the left side camera, and the right side camera may be displayed on the camera image display section 420. The synthetic image may be a bird's-eye view image.

Each camera is installed such that a part of the upper turning body 3 is included in a camera image captured by the camera. As the image displayed on the camera image display section 420 includes the part of the upper turning body 3, an operator can easily grasp a distance between an object displayed on the camera image display section 420 and the excavator.

The camera image display section 420 also displays a camera icon 421 indicating a direction of the camera S6 by which an image currently displayed on the camera image display section 420 is captured. The camera icon 421 is another example of the excavator setting state display part, and includes an excavator icon 421*a* representing a top view of the excavator and a belt-shaped direction display icon 421*b* indicating a direction of the camera S6 by which an image displayed on the camera image display section 420 is captured.

In the example illustrated in FIG. 6A, the direction display icon 421*b* is displayed below the excavator icon 421*a* (the direction display icon 421*b* is displayed at the opposite side of an attachment), which indicates that an image behind the excavator that is captured by the rear camera is being displayed. In a case in which an image captured by the right side camera is being displayed on the camera image display section 420, the direction display icon 421*b* is displayed at the right side of the excavator icon 421*a*. In a case in which an image captured by the left side camera is being displayed on the camera image display section 420, the direction display icon 421*b* is displayed at the left side of the excavator icon 421*a*.

An operator can switch an image to be displayed on the camera image display section 420 to another image captured by one of the other cameras, by pressing an image switching switch.

In a case in which a camera S6 is not installed in the excavator, different information instead of the camera image display section 420 may be displayed.

The first operation guidance display section 430 displays guidance information for various operations. In the example illustrated in FIG. 6A, the first operation guidance display section 430 includes a position displaying image 431 for displaying tip guidance information which is an example of the working part guidance information. The position displaying image 431 is a bar gauge in which multiple segments 431*a* are arranged vertically, which represents a degree of distance from a working part of an attachment (such as the front edge of the bucket 6) to a target construction surface. Specifically, among seven segments, a bucket position displaying segment is displayed in a different color from that of other segments, in accordance with a distance from the front edge of the bucket 6 to a target construction surface. In the example illustrated in FIG. 6A, a third segment from the top is displayed in a different color from that of other segments, as the bucket position displaying segment. The position displaying image 431 may include more segments so that a distance from the front edge of the bucket 6 to a target construction surface can be displayed more precisely.

As described above, the machine guidance device 50 changes color of a part of a region of a display screen on the first display device D3, in accordance with a degree of the distance. However, the machine guidance device 50 may change color of an entire region of the display screen, in accordance with a degree of the distance. In this case, as a size of the region whose color changes is large, an operator can easily recognize the change of color within a peripheral visual field.

The part of the region of the display screen is a comparatively small region, such as one of the segments 431*a* in the first operation guidance display section 430, and the entire region of the display screen is a comparatively large region, such as an entirety of a region in a frame of the first operation guidance display section 430. An entire region of the display screen may be an entire region of the camera image display section 420, or an entire region of the output image Gx.

More specifically, the bottom segment in the segments 431a is set to a reference segment representing a level of a target construction surface, and as a distance from the front edge of the bucket 6 to the target construction surface becomes larger, an upper segment is displayed in a different color from that of other segments, as the bucket position displaying segment. Conversely, as a distance from the front edge of the bucket 6 to a target construction surface becomes smaller, a lower segment is displayed in a different color from that of other segments, as the bucket position displaying segment. The bucket position displaying segment is displayed such that the bucket position displaying segment moves up and down, in accordance with change of a distance from the front edge of the bucket 6 to a target construction surface. An operator can grasp a current distance from the front edge of the bucket 6 to a target construction surface by looking at the position displaying image 431. Note that other segments than the bottom segment may be set to a reference segment.

The position displaying image 431 includes a value image 431b. The value image 431b is an image representing a distance from a working part of an attachment (such as the front edge of the bucket 6) to a target construction surface by a numerical value. In the example illustrated in FIG. 6A, the value image 431b indicates that the front edge of the bucket 6 is located vertically above a target construction surface by 0.5 meters. A sign "+" included in the value image 431b represents that the bucket 6 is positioned above a target construction surface, and if a sign "−" is included in the value image 431b, it means that the bucket 6 is positioned below a target construction surface.

As described above, the output image Gx includes a display part including the operation information of the excavator, a display part including a camera image captured by the camera S6, and a display part including tip guidance information. However, one of the display parts including the operation information of the excavator and the display part including a camera image may be omitted. For example, the output image Gx may include only the display part including a camera image and the display part including tip guidance information. Alternatively, the output image Gx may include only the display part including the operation information and the display part including tip guidance information.

Next, the output image Gy displayed on the second display device D3S will be described. The output image Gy includes a second operation guidance display section 430S and a terrain image display section 440, in an example illustrated in FIG. 6B. An image displayed on each of the sections is generated by the conversion processor D3Sa of the second display device D3S, based on various data transmitted from the machine guidance device 50.

The second operation guidance display section 430S displays guidance information for various operations. In the example illustrated in FIG. 6B, the second operation guidance display section 430S includes a first target construction surface display image 432, a second target construction surface display image 433, and a numerical information image 434.

The first target construction surface display image 432 displays a relation between the bucket 6 and a target construction surface schematically as tip guidance information. The first target construction surface display image 432 schematically displays the bucket 6 and a target construction surface, which are seen by an operator looking ahead of the excavator while sitting in the cab 10, as a bucket icon 451 and a target construction surface image 452. The bucket icon 451 is a diagram representing the bucket 6, and has a shape of the bucket 6 seen from the cab 10. The target construction surface image 452 is a diagram representing a ground which is a target surface, and is displayed with a tilt angle of the bucket 6 with respect to an actual target construction surface (in the example illustrated in FIG. 6B, the tilt angle is 10.0°). A gap displayed between the bucket icon 451 and the target construction surface image 452 changes in accordance with change of an actual distance from the front edge of the bucket 6 to a target construction surface. Similarly, the tilt angle of the bucket 6 that is displayed is also changed in accordance with change of an actual positional relationship between the bucket 6 and a target construction surface.

An operator can grasp a positional relationship between the bucket 6 and a target construction surface or a tilt angle of the target construction surface, by looking at the first target construction surface display image 432. To facilitate visibility for an operator, the target construction surface image 452 may be displayed in the first target construction surface display image 432 such that a tilt angle of the target construction surface image 452 is larger than an actual tilt angle. An operator can roughly grasp a tilt angle based on the target construction surface image 452 displayed in the first target construction surface display image 432. When the operator desires to recognize an accurate tilt angle, by looking at a tilt angle displayed under the target construction surface image 452, the operator can recognize the actual tilt angle.

The second target construction surface display image 433 schematically displays a relation between the bucket 6 and a target construction surface, seen from the side of the bucket 6, as tip guidance information. The second target construction surface display image 433 displays a bucket icon 451 and a target construction surface image 452. The bucket icon 451 has a shape of the bucket 6 seen from the side. The target construction surface image 452 is displayed with a tilt angle of a target construction surface with respect to a horizontal plane (in the example illustrated in FIG. 6B, the tilt angle is 20.0°). A gap displayed between the bucket icon 451 and the target construction surface image 452 changes in accordance with change of an actual distance from the front edge of the bucket 6 to a target construction surface. Similarly, the tilt angle that is displayed is also changed in accordance with change of an actual positional relationship between the bucket 6 and a target construction surface.

An operator can grasp a positional relationship between the bucket 6 and a target construction surface or a tilt angle of the target construction surface, by looking at the second target construction surface display image 433. To facilitate visibility for an operator, the target construction surface image 452 may be displayed in the second target construction surface display image 433 such that a tilt angle of the target construction surface image 452 is larger than an actual tilt angle. An operator can roughly grasp a tilt angle based on the target construction surface image 452 displayed in the second target construction surface display image 433. When the operator desires to recognize an accurate tilt angle, by looking at a tilt angle displayed under the target construction surface image 452, the operator can recognize the actual tilt angle.

The numerical information image 434 displays various values representing a relation between the front edge of the bucket 6 and a target construction surface, as tip guidance information. In the example illustrated in FIG. 6B, a height from a target construction surface to the front edge of the bucket 6 is displayed (which is a vertical distance from the target construction surface to the front edge of the bucket 6, and is 1.00 meters in the example illustrated in FIG. 6B) in the numerical information image 434. Also in the numerical information image 434, a distance from the turning axis to the front edge of the bucket 6 (3.50 meters in the example illustrated in FIG. 6B) is displayed. Other numerical information, such as a turning angle of the upper turning body 3 with respect to a reference direction, may be displayed in the numerical information image 434.

The terrain image display section 440 displays a terrain image of a work site. The terrain image includes, for example, a two-dimensional terrain image and a three-dimensional terrain image. The terrain image is, for example, displayed such that a predetermined direction (such as the north) is displayed at an upper side of a screen. In an example illustrated in FIG. 6B, the terrain image display section 440 displays a three-dimensional terrain image which is generated based on information about a position of the excavator obtained by the positioning device S8, and based on information about a target construction surface stored in the storage device D4. The three-dimensional terrain image is displayed such that the north direction corresponds to an upper side of a screen, and includes a three-dimensional CG image of a target construction surface (a target terrain image), a three-dimensional CG image of an excavator 440a, an operation direction display image 440b indicating an operation direction for causing the excavator to directly face a slope of a work target, and a direction deviation display image 440c. A slope of a work target may be distinguishably displayed from other surfaces. In the example illustrated in FIG. 6B, a slope of a work target is displayed by hatching of a dot pattern, such that the slope of the work target can be distinguished from other surfaces. A position of the three-dimensional CG image of an excavator 440a is determined based on the information about a position of the excavator. The operation direction display image 440b and the direction deviation display image 440c are images generated by the operating direction display unit 504 of the machine guidance device 50.

The operation direction display image 440b is a circular image indicating an operation direction for causing the excavator to directly face a work target, and includes an arrow AR1 and a scale G1. The direction deviation display image 440c is a circular image indicating a shift of a direction of the excavator with respect to a direction of a work target, and includes a line segment L1 and a scale G2.

Similar to the terrain image, the operation direction display image 440b is displayed such that a predetermined direction (such as the north) corresponds to an upper side of a screen. In the example illustrated in FIG. 6B, because the terrain image is displayed such that the north direction corresponds to an upper side of a screen, the operation direction display image 440b is also displayed such that the north direction corresponds to an upper side of a screen. In a case in which the terrain image is displayed such that the south direction corresponds to an upper side of a screen, the operation direction display image 440b is also displayed such that the south direction corresponds to an upper side of a screen. The direction deviation display image 440c is displayed such that a front of the upper turning body 3 corresponds to an upper side of a screen.

The arrow AR1 indicates a direction which the excavator should face. In the example illustrated in FIG. 6B, the arrow AR1 represents that the excavator should face southeastward (forward right direction with respect to a current direction of the excavator). In this case, by turning the upper turning body 3 right, or by moving the excavator to a forward right direction, an operator can cause the excavator to directly face a slope.

The scales G1 and G2 indicate a direction of the excavator. In the example illustrated in FIG. 6B, the scale G1 includes an upper side scale disposed at an upper end of the circular image, and a lower side scale disposed at a lower end of the circular image. Each of the upper side scale and the lower side scale is composed of five line segments, and a main scale, which is the longest line segment and is located at the middle, corresponds to the left-right axis of the upper turning body 3. The scale G2 includes a left side scale disposed at a left end of the circular image, and a right side scale disposed at a right end of the circular image. Each of the left side scale and the right side scale is composed of five line segments, and a main scale, which is the longest line segment and is located at the middle, corresponds to the left-right axis of the upper turning body 3. The scales G1 and G2 may be displayed outside of the circular image.

The line segment L1 corresponds to an extending direction of a slope of a work target, that is, the line segment L1 represents a line segment parallel to an extending direction of a slope of a work target. In the example illustrated in FIG. 6B, the direction deviation display image 440c represents a state in which the extending direction of the slope deviates by approximately 45 degrees from the left-right axis of the upper turning body 3. The line segment L1 passes through a center of the circular image, and has the same length as a diameter of the circular image. However, the line segment L1 is not required to pass through the center of the circular image. The length of the line segment L1 is not necessarily the same as the diameter of the circular image. For example, the line segment L1 may protrude from the circular image.

Next, another example of an image displayed on the terrain image display section 440 in the output image Gy will be described with reference to FIG. 6C. Both an image displayed on the terrain image display section 440 in FIG. 6C and the image displayed on the terrain image display section 440 in FIG. 6B represent a state of the same work site at the same time.

Figure 6C:
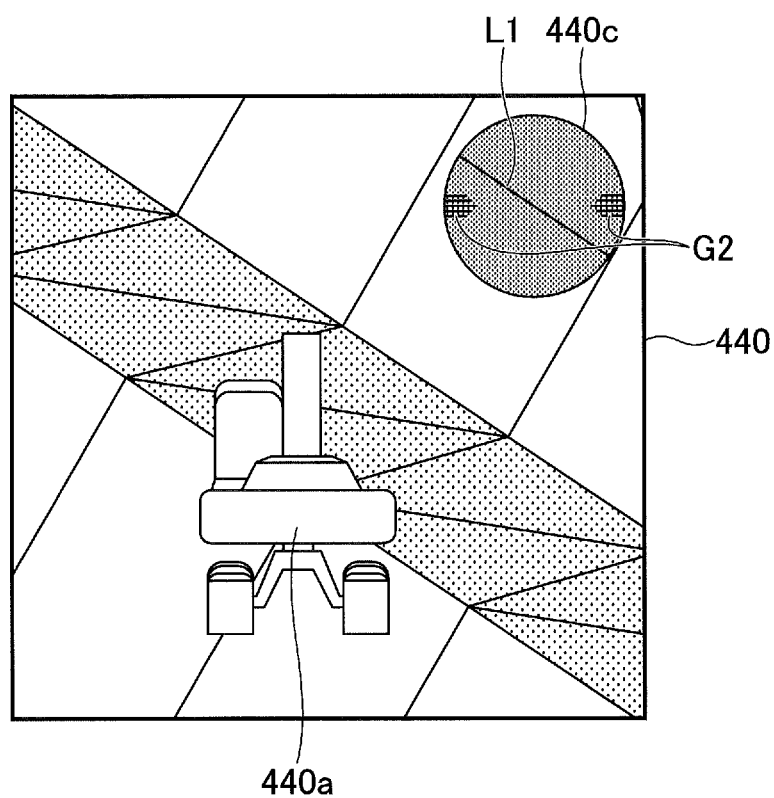
FIG. 6C is a diagram illustrating an example of an image displayed on a terrain image display section.

The image in FIG. 6C is different from the image in FIG. 6B in that the image in FIG. 6C represents a state when the work site is seen from a backward-diagonally upward side of the excavator, while the image in FIG. 6B represents a state when the work site is seen from the right-side diagonally upward of the excavator. Also, the image in FIG. 6C is different from the image in FIG. 6B in that a display of the operation direction display image 440b is omitted in FIG. 6C.

The image in FIG. 6C can be switched to the image in FIG. 6B (or the image in FIG. 6B can be switched to the image in FIG. 6C) by a touch operation of a touch panel, such as a swipe operation or a flick operation.

The terrain image display section 440 is displayed in the second display device D3S that is disposed at a location closer to an operator than the first display device D3. Because the terrain image display section 440 is displayed, an operator of the excavator can recognize a whole aspect of a work site and a position of the excavator in the work site when the operator is not operating the operation device 26 in the cab 10. And, the operator can consider and confirm a plan for a next construction work, a place where the excavator is to be positioned for the next construction work, or the like. In the above described example, a case in which a target terrain image is displayed is described. However, in a case in which a combination of a current construction status (current terrain information) and a target terrain image is displayed, an operator can consider and confirm a plan for a next construction work, after the operator confirms an overall construction status of a work site. In the example illustrated in FIG. 6B, the terrain image display section 440 displays a region which includes an image of the excavator to be operated. However, the terrain image display section 440 may display a region which does not include an image of the excavator when a screen is scrolled by a cursor operation or a touch operation such as a swipe. Alternatively, the terrain image display section 440 may display only an image of the excavator to be operated. That is, the terrain image display section 440 may display at least one of a target terrain image and an image of the excavator. A scale of an image to be displayed may be changed in accordance with a touch operation such as a pinch in operation or a pinch out operation. A size of a work area may be changed to a desired size, such as an entire region of a construction site, and a region that is constructed on a current day.

As described above, while the excavator is operated, a combination of the screens illustrated in FIG. 6A and FIG. 6B is displayed on the first display device D3 and the second display device D3S. An operator can perform an excavation operation while capturing the bucket 6 through the front glass FG within a central visual field and capturing the output image Gx displayed on the first display device D3 within a peripheral visual field. Also, the operator can recognize a detailed positional relationship between the front edge of the bucket 6 and a target construction surface, a positional relationship between a target construction surface and a position of the excavator, and the like, by turning his or her face to the second display device D3S when necessary. Further, the operator can change a location of a terrain image to be displayed, a range of a terrain image to be displayed, a direction of a terrain image to be displayed, and the like, by a touch operation of a touch panel such as swipe, pinch in, pinch out, flick, and the like.

Figure 7A:
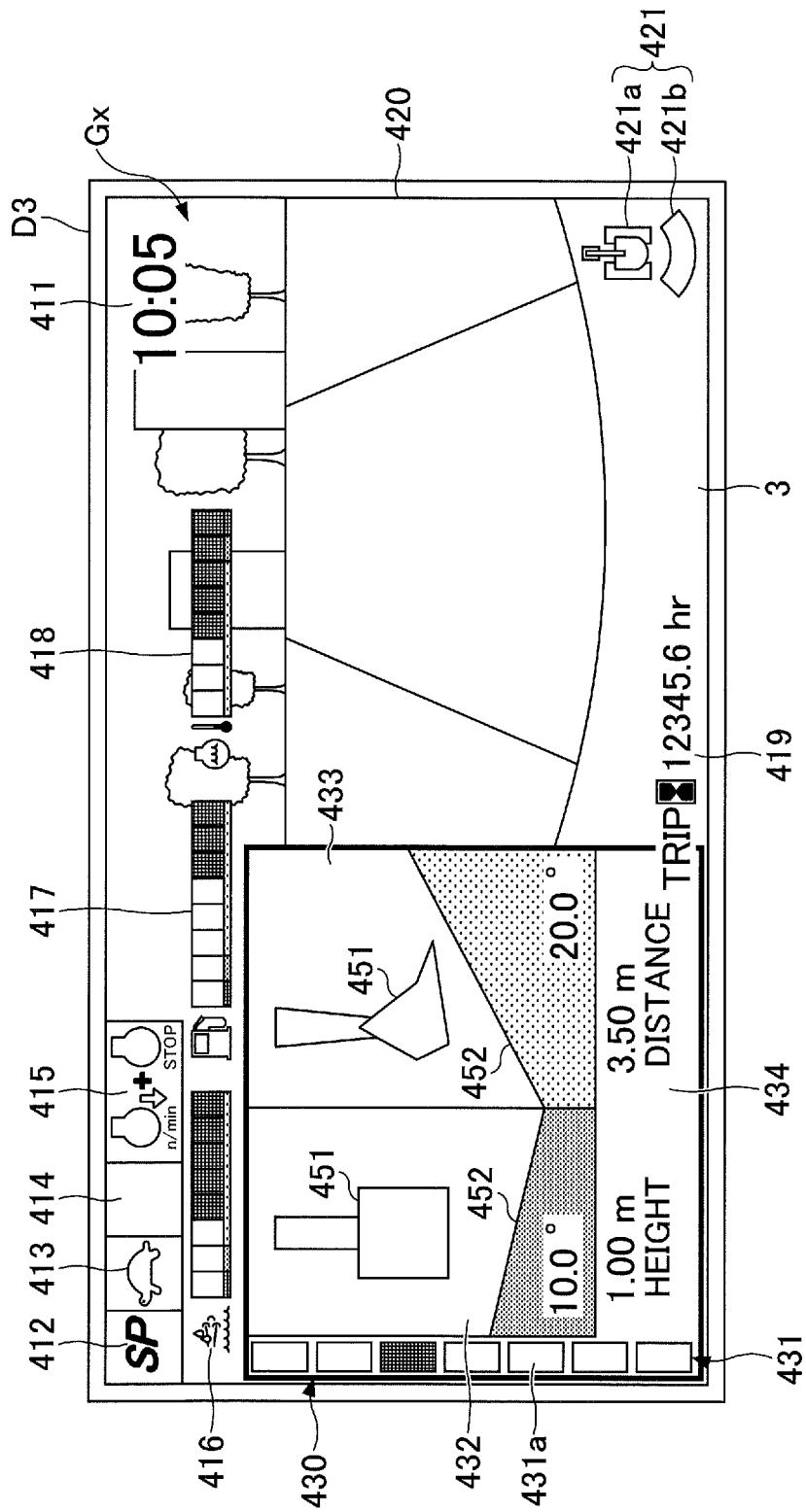
FIG. 7A is a diagram illustrating another example of an output image displayed on a first display device.
Figure 7B:
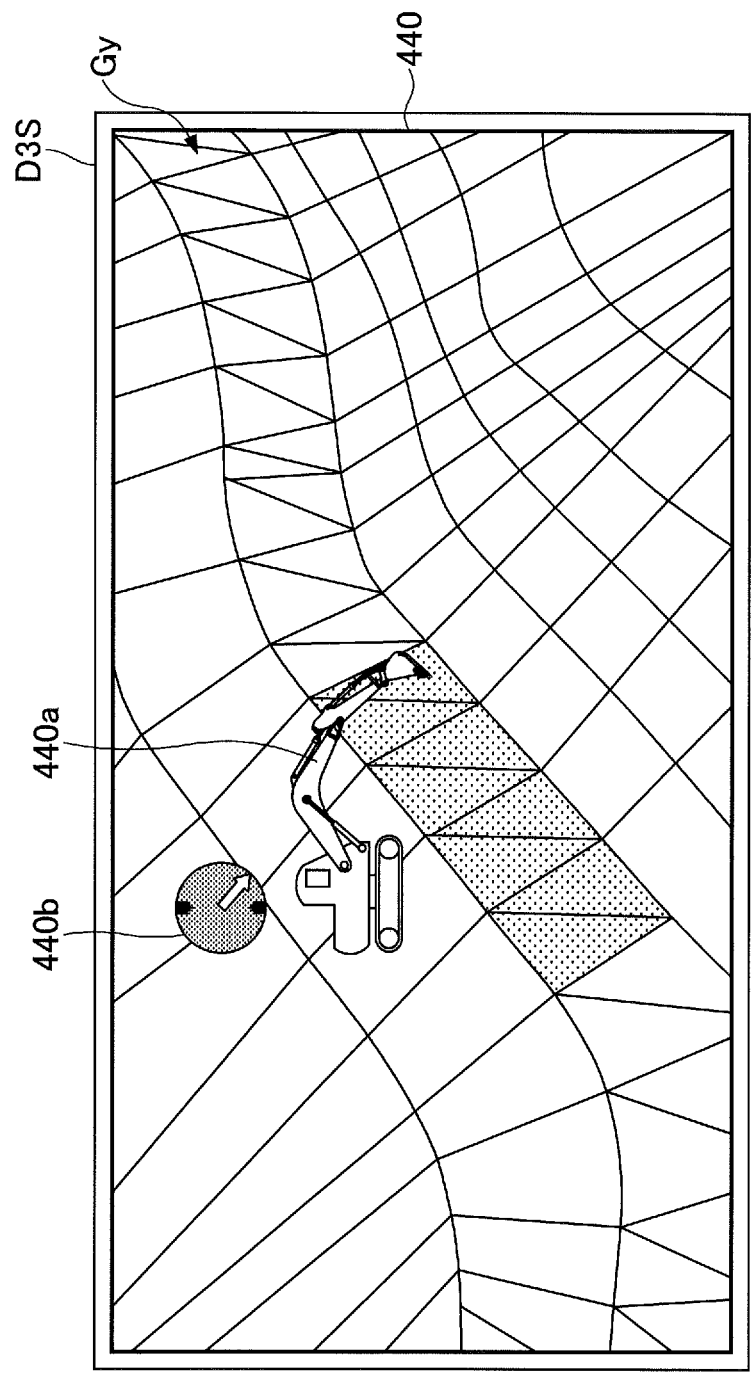
FIG. 7B is a diagram illustrating another example of an output image displayed on a second display device.

Next, an example of output images displayed when the machine guidance device 50 is used will be described with reference to FIG. 7A and FIG. 7B. FIG. 7A illustrates another example of an output image Gx displayed on the first display device D3, and FIG. 7B illustrates an example of an output image Gy displayed on the second display device D3S. The output image Gx illustrated in FIG. 7A is different from the output image Gx illustrated in FIG. 6A in that, in the output image Gx illustrated in FIG. 7A, the first operation guidance display section 430 includes the first target construction surface display image 432, the second target construction surface display image 433, and the numerical information image 434, which was displayed in the second operation guidance display section 430S in the output image Gy in the example illustrated in FIG. 6B. That is, the first display device D3 displays tip guidance information by using not only a bar gauge but also a diagram of the bucket 6 and a cross section of a target construction surface. However, other points are common to the output image Gx in FIG. 6A. The output image Gy illustrated in FIG. 7B is different from the output image Gy illustrated in FIG. 6B in that the terrain image display section 440 is displayed in an entirety of the output image Gy illustrated in FIG. 7B, but other points are common to the output image Gy illustrated in FIG. 6B.

As described above, because the terrain image display section 440 displayed in the output image Gy in FIG. 7B is larger than that of FIG. 6B, the output image Gy in FIG. 7B can display more detailed information regarding a terrain image of a work site, as compared to the output image Gy in FIG. 6B. Also, an operator can see the detailed information during operation. Further, the second display device D3S does not obstruct a view of the operator.

The preferred embodiment of the present disclosure is described above. However, the present invention is not limited to the above-described embodiment. Various modifications and substitutions may be made to the above-described embodiment without departing from the scope of the present invention.

For example, in the above-described embodiment, the position displaying image 431, the first target construction surface display image 432, the second target construction surface display image 433, and the numerical information image 434 are displayed on either the first operation guidance display section 430 or the second operation guidance display section 430S. However, at least one of the position displaying image 431, the first target construction surface display image 432, the second target construction surface display image 433, and the numerical information image 434 may be displayed on both the first operation guidance display section 430 and the second operation guidance display section 430S.

What is claimed is:

1. An excavator comprising:
a lower traveling body;
an upper turning body pivotably mounted on the lower traveling body;
an operator's compartment provided to the upper turning body;
an attachment attached to the upper turning body;
a controller configured to calculate a distance between a height of a working part of the attachment and a predetermined target height;
a first display device installed in the operator's compartment, the first display device being configured to display operation information of the excavator and working part guidance information based on the distance; and
a second display device installed in the operator's compartment, the second display device being configured to display a target terrain image, an image representing the excavator, or both the target terrain image and the image representing the excavator.

2. The excavator according to claim 1, wherein the first display device is installed in front of a right side relative to an operator's seat in the operator's compartment.

3. The excavator according to claim 1, wherein the first display device is installed at a position capable of being seen from an operator facing forward while sitting on an operator's seat in the operator's compartment.

4. The excavator according to claim 1, wherein an area of a front glass of the operator's compartment covered by the second display device is smaller than an area of the front glass covered by the first display device.

5. The excavator according to claim 1, wherein the second display device is installed at a position closer to an operator's seat than the first display device.

6. The excavator according to claim 1, wherein the distance is a distance between a height of a tip of a bucket configuring the attachment and the predetermined target height.

7. The excavator according to claim 1, wherein the controller changes a color of a part or an entirety of a display screen of the first display device, as the working part guidance information, in accordance with a degree of the distance.

8. The excavator according to claim 1, wherein the working part guidance information includes at least one of a bar gauge representing a degree of the distance and a numerical value.

9. The excavator according to claim 1, wherein the working part guidance information includes a diagram representing a target surface and a diagram representing the attachment.

10. The excavator according to claim 1, wherein the second display device displays a positional relationship of the excavator to the target terrain image.

11. An excavator comprising:
a lower traveling body;
an upper turning body pivotably attached to the lower traveling body;
an operator's compartment provided to the upper turning body;
a camera attached to the upper turning body;
an attachment attached to the upper turning body;
a controller configured to calculate a distance between a height of a working part of the attachment and a predetermined target height;
a first display device installed in the operator's compartment, the first display device being configured to display an image captured by the camera, operation information of the excavator, or both the image captured by the camera and the operation information of the excavator, and to display working part guidance information based on the distance; and
a second display device installed in the operator's compartment, the second display device being configured to display a target terrain image, an image representing the excavator, or both the target terrain image and the image representing the excavator.

* * * * *